Patented May 3, 1949

2,468,982

UNITED STATES PATENT OFFICE 2,468,982

PREPARATION OF BIS-PHENOLS

Jacob Eden Jansen, Akron, Ohio, assignor to The B. F. Goodrich Company, New York, N. Y., a corporation of New York No Drawing. Application October 19, 1946, Serial No. 704,525

10 Claims. (Cl. 260—619)

1

This invention relates to an improved process for the preparation of chemical products, especially bis-phenols, by the condensation of a phenol with a carbonyl compound, especially a ketone, and pertains particularly to the use of certain agents for promoting or catalyzing the condensation.

It is known that bis-phenols containing a single carbon atom attached to the aromatic nuclei of two phenolic radicals may be prepared by the condensation of phenols with ketones in the presence of an acidic condensing agent such as hydrochloric or sulfuric acid and in the presence or absence of a solvent for the reactants. It is also known that hydrogen sulfide, alkyl mercaptans, thiophenols and thio-organic acids may be used as catalysts to promote the condensation. In addition, it has been proposed to carry out the condensation of phenol with acetone to form 2,2-bis(4-hydroxyphenyl) propane using anhydrous hydrogen chloride as the condensing agent, at least three mole proportions of phenol per mole of acetone, and a temperature below 80° C., in order to obtain a faster reaction than would otherwise be possible.

Even when all these expedients are employed, however, the condensation of phenols with ketones still requires a reaction time of about twenty-four hours or longer in order for a substantially quantitative yield of bis-phenol to be obtained. Accordingly, it is quite desirable that a more economical and efficient method be found for promoting the condensation. The principal object of this invention is to provide such a method.

This object is attained according to this invention by carrying out the acid condensation of phenols with ketones in the presence of a mercapto-substituted aliphatic carboxylic acid. When such a substance is present during the reaction either as such or in the form of a mercaptol of the mercapto-acid (which may be formed in the reaction mixture from the mercapto-acid by reaction at the mercapto group with the ketone), it has been found that the reaction is completed in less than $\frac{1}{10}$ of the time that has heretofore been required and that the obtainment of quantitative yields of bis-phenol is easily possible in as little as thirty minutes to two or three hours total reaction time.

Any of the various mercapto-substituted aliphatic carboxylic acids may be used as the catalyst in this invention. For example, mercapto acetic acid, thiolactic acid, beta-mercapto propionic acid, alpha-, beta- and gamma-mercapto

2 butyric acids, alpha-beta-dimercapto butyric acid, mercapto-substituted myristic or oleic acid, mercapto-substituted adipic, succinic and aconitic acids and the like are all effective in promoting the condensation of phenols with ketones. Other acids possessing the structure

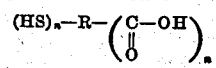

wherein $n$ is a small integer, say from 1 to 3, preferably 1, and R is an aliphatic hydrocarbon residue either saturated or unsaturated, preferably the former, and preferably containing from 1 to 5 carbon atoms, may also be used. Best results are secured by the use of mercapto-substituted aliphatic monocarboxylic acids containing from two to five carbon atoms and in particular by the use of beta-mercapto propionic acid. Hence, the use of this latter compound is particularly preferred.

Instead of adding the mercapto acid as such, it may be generated in situ by employing a salt or ester or other derivative thereof which hydrolyzes in the presence of the acid condensing agent to form the mercapto acid. Thus, it has been found that alkali metal beta-mercapto propionates (which are converted into beta-mercapto propionic acid), and esters of beta-mercapto propionic acid (which are hydrolyzed by acids to beta-mercapto propionic acid) are just as effective as beta-mercapto propionic acid itself. Moreover, a mercaptol or mercaptal of the mercapto-acid may first be formed outside the reaction mixture by reaction with a ketone or aldehyde and this substance added as the catalyst. For example, acetone di-(beta-carboxyethyl)-mercaptol or the mercaptal from acetaldehyde and beta-mercapto propionic acid, or the like, may be used as the catalyst and have also been found to be just as effective as beta-mercapto propionic acid itself.

Except for the requirement that one of the above-described catalysts be present, the condensation between the phenol and the ketone may be carried out in the usual manner. An acid-reacting condensing agent such as sulfuric acid, hydrochloric acid, anhydrous hydrogen chloride, sulfuryl chloride, aluminum chloride, calcium chloride together with HCl, or the like is preferably present during the reaction, since reaction of a phenol and a ketone to form a bisphenol requires an acidic medium preferably a pH of about 1 to 5. Although other methods of rendering the reaction mixture acidic may also be used, it is generally most convenient to effect the condensation in the presence of hydrochloric acid or anhydrous hydrogen chloride.

The proportion of the phenol and ketone reactants, of the acid condensing agent and of the catalyst may be varied widely. In general, a molecular excess of phenol, that is, more than two molecular proportions of phenol for each mole of ketone, is advantageous, best results being secured when about 4 to 8 moles of phenol are used for each mole of ketone. The proportion of the acid condensing agent is in no way critical but ordinarily about 0.1 to 0.5 mole of condensing agent is used for each mole of ketone reactant. When anhydrous hydrogen chloride is used as the acid condensing agent, it is most convenient to saturate the reaction mixture therewith.

Only a very small proportion of the catalyst is necessary to bring about a remarkable increase in reaction rate. On the other hand, a considerable proportion of this ingredient, as high as say 5 or 10% of the ketone reactant, is even more effective in accelerating the reaction and produces no adverse effects. In most instances, however, it is preferable to use as the catalyst from about 0.01 to 0.5 mole of a mercapto-substituted aliphatic carboxylic acid for each mole of the ketone reactant since the reaction is thereby accelerated to such an extent that it is complete in no more than two or three hours.

In carrying out the reaction, the reactants, the acid condensing agent and the catalyst are mixed in any desired order. In general, it is most convenient to mix the phenol and the ketone and then to add the condensing agent and a mercapto-substituted carboxylic acid as the catalyst. If both of the reactants are solids, an inert organic diluent or solvent is preferably added with the reactants in order that the reactants may be present in liquid form but if the two reactants form a liquid system on mixing with one another, the presence of a solvent is not so advantageous, although in this instance a solvent may, of course, be used if desired. Examples of solvents and diluents which are useful in this reaction include glacial acetic acid, benzene, hexane, gasoline, ethylene dichloride, chlorobenzene, and other unreactive organic liquids.

The reaction is most advantageously carried out with stirring and without external heating or cooling. Since the reaction is exothermic, a rise in temperature occurs during the reaction but this does not ordinarily raise the temperature above about 50° C. Although such normal operating temperatures of about 20 to 50° C. are preferred, the reaction may also be effected at temperatures as low as 0° C. or lower or as high as 100° C. or even higher provided, of course, that the reaction mixture is maintained in liquid form. Since acetone boils at about 57° C., increased pressure is, of course, necessary when working with this reactant if temperatures in excess of 57° C. are to be employed for the reaction.

It is preferable that the reaction be carried out in a closed system, as by the use of an autoclave or other suitable closed reaction vessel, especially when hydrogen chloride is the acidic condensing agent used, in order to prevent volatilization and escape of this reagent.

The bis-phenol formed from the reaction is in most cases insoluble or only partly soluble in the reaction medium and separates from the medium in solid crystalline form. As the reaction proceeds, the formation of more solid product causes the reaction mixture to assume the form of a semi-solid mush. The reaction product may then be separated from the crude reaction mixture in any of the usual ways as by distilling excess phenol, preferably under vacuum, from the reaction mixture and then washing the crude product to remove the acid condensing agent and finally filtering and drying to obtain the bis-phenol in fairly pure form. Alternatively, the bis-phenol may be crystallized from a solvent such as ethylene dichloride, tetrachloroethane, chlorobenzene, hexane or the like after removal of the unreacted phenol. When the product is purified by distillation of unreacted phenol, it is preferable that anhydrous hydrogen chloride or calcium chloride together with a small amount of hydrochloric acid be used as the acid condensing agent since distillation in the presence of other acid condensing agent such as sulfuric acid has been found to yield a bis-phenol which is undesirably colored by impurities.

The practice of the invention is further illustrated by the following specific examples in which all parts are by weight.

*Example I*

A mixture of 1880 parts of phenol and 290 parts of acetone is prepared in a closed reaction vessel equipped with means for agitating the contents thereof. 200 parts of anhydrous calcium chloride are then introduced and the contents of the vessel allowed to cool to room temperature. While agitating the reaction mixture, 17.5 parts of 37% concentrated hydrochloric acid and 2 parts of beta-mercapto propionic acid as the catalyst are added. The color of the reaction mixture immediately begins to change from a light tan to a brilliant orange red (which may be due to a preliminary reaction between the catalyst and some other ingredient, probably the ketone, which is present), and at the same time there is a small temperature rise. After stirring the contents of the reaction vessel for about 30 to 45 minutes, crystallization of the product occurs to form a slurry of the solid reaction product in the remaining liquid reactants. This slurry gradually thickens until at about 1½ hours after the start of the reaction the slurry is so thick that it can no longer be efficiently stirred. The total temperature rise during the reaction is about 15° C., the temperature of the reaction mixture at the end of the reaction being about 40° C. The reaction mixture is then allowed to stand for an additional 30 minutes after which it is distilled under vacuum. The distillate consists of water formed by the reaction and excess phenol, the distillation being terminated after all of the volatile material has been removed at 150° C. and at a vacuum of 40 m. m. The molten product remaining is then poured into 2,000 parts of warm water, filtered, washed several times with water and then dried. There is thus obtained a substantially quantitative yield of 1,140 parts of substantially pure 2,2-bis-(4-hydroxyphenyl) propane melting at 150 to 155° C.

*Example II*

The procedure of Example I is repeated except that 2 parts of mercapto acetic acid are used in place of the mercapto propionic acid. Only about three hours are required for the reaction and the product 2,2-bis-(4-hydroxyphenyl) propane is again obtained in substantially quantitative yield.

*Example III*

A mixture of 376 parts of phenol, 58 parts of acetone and 250 parts of 37% aqueous hydrochloric acid is prepared, the large amount of acid being used so that the reaction mixture may be stirred more efficiently in the latter stages of the reaction rather than because such a large amount is necessary to the reaction. To the resulting mixture, there is then added with stirring 2 parts of beta-mercapto propionic acid. Stirring is then continued for a total of 5 hours at a reaction temperature varying from about 25° at the start of the period to about 40° at the end of the period. The reaction mixture is then poured into water and the mixture agitated so as to dissolve the excess phenol. The solid product, suspended in water, is then filtered, washed and dried. A quantitative yield of 2,2-bis-(4-hydroxyphenyl) propane melting at 150 to 155° C. is thus obtained.

When this example is repeated using 10 parts of hydrogen sulfide in place of the beta-mercapto propionic acid, the yield of the bis-phenol is only about 40% and the bis-phenol melts at a temperature of 126 to 142° indicating that the product is in rather impure form. It is thus apparent that beta-mercapto propionic acid is far more effective than hydrogen sulfide in promoting the reaction of phenol with acetone. Moreover, when the example is repeated with 4 parts of thiocresol in place of beta-mercapto propionic acid, a 50% yield of an impure product melting at 115 to 125° C. is obtained, thereby showing the greater catalytic activity of beta-mercapto propionic acid than of thiocresol. Mercapto-substituted aromatic acids such as 3-mercapto benzoic acid when substituted for the beta-mercapto propionic acid in the above example are also ineffective in producing a high yield of product in a short time, the yield of product being only about 29% when such materials are used. When no catalyst at all is employed in the above example, the yield of product is only about 17%.

*Example IV to VII*

In each of these examples, a mixture of 376 parts of phenol and 58 parts of acetone is prepared and is then saturated with anhydrous hydrogen chloride. Various catalysts are then introduced into the reaction mixture and reaction is allowed to take place with stirring at a temperature of about 20 to 40° C. for a period of time necessary to complete the reaction as determined by the point at which the reaction mixture becomes so thick with reaction product that it is impossible to stir. The catalyst used for the various examples, the time of reaction and the percent yield of 2,2-bis-(4-hydroxyphenyl) propane obtained are shown in the following table:

| Example | Catalyst | Amount of Catalyst | Time of Reaction | Yield |
|---|---|---|---|---|
| | | Parts | Hours | Per cent |
| IV | Beta-Mercapto Propionic Acid | 2 | 3 | 97 |
| V | Acetone Di-(beta-carboxy-ethyl) Mercaptol | 2 | 3 | 95 |
| VI | Sodium Beta-Mercapto Propionate | 1.3 | 2½ | 95 |
| VII | Ethyl Beta-Mercapto Propionate | 1.3 | 3 | 91 |
| | Control | None | 3½ | 43 |

When other mercapto-substituted aliphatic carboxylic acids (as well as mercaptols thereof and derivatives thereof which are converted into the free acid in an acidic medium) are used in place of the specific catalysts illustrated in the above examples, similar results are obtained, reaction occurring to form the bis-phenol in a time considerably less than has heretofore been necessary.

Moreover, this same advantage is secured when other of the generic class of phenols are substituted for phenol itself and when other ketones are used in place of acetone. Examples of phenols which may be used in the above examples to replace phenol include cresols, xylenols, and other alkylated phenols, o-phenyl-phenol, alpha- and beta-naphthol, o-chloro-phenol and other halogenated phenols, nitro-phenols and the like. Examples of ketones which may be used in place of acetone include di-n-propyl ketone, di-n-butyl ketone, methyl ethyl ketone, methyl isopropyl ketone, methyl amyl ketone, mesityl oxide, acetonyl acetone and other aliphatic ketones, acetophenone, propiophenone, cyclohexanone and the like.

The following examples serve to illustrate the use of reactants other than phenol and acetone:

*Example VIII*

The procedure of Example II is repeated except that 432 parts of o-cresol are employed in place of 376 parts of phenol. There is obtained a 95% yield of a product melting at about 120° C. and identified as the bis-phenol of the structure:

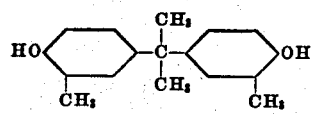

The reaction requires less than 8 hours whereas several days are required in the absence of mercapto-propionic acid.

*Example IX*

The procedure of Example II is again repeated except that 72 parts of methyl ethyl ketone are used in place of the 58 parts of acetone. Condensation occurs in less than 5 hours to produce a high yield of a product melting at about 120° C. and identified as the bis-phenol of the structure:

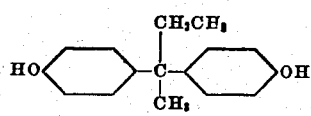

In most instances of reactions between a phenol and a ketone, the reaction product consists of a bis-phenol of definitely determinable chemical structure. In some instances, however, complex resinous products are formed. It is to be understood, however, that the catalysts of this invention are effective in promoting the condensation between any phenol and any ketone regardless of whether a simple bis-phenol or a complex resinous reaction product is produced.

It has also been found that the acid condensation of phenols with formaldehyde, as well as other aldehydes such as acetaldehyde, propionaldehyde, butyraldehyde, benzaldehyde and the like is catalyzed by the presence of the above-described catalyst. Such condensations are inherently much more rapid than condensations of phenols with ketones and much more likely to lead to resin formation and as such are not generally considered equivalent to condensation of phenols with ketones. However, they are effected even more rapidly by the catalysts of this invention, although, of course, because of their more rapid nature, the advantage in using a catalyst is not so pronounced. The following example illustrates this aspect of the invention.

Example X

A closed reaction vessel is charged with 752 parts of phenol, 30 parts of substantially anhydrous formaldehyde, 2 parts of beta-mercapto propionic acid and sufficient anhydrous hydrogen chloride to saturate the mixture. The contents thereof are stirred for one hour at 25 to 50° C. after which excess phenol is removed by vacuum distillation and the product poured into water and filtered. The product consists of a mixture of methylene bis-phenol

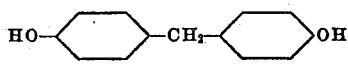

with resinous products from further condensation of the phenol and aldehyde. A higher yield of product is obtained than when the example is repeated in the absence of mercapto-propionic acid.

It is thus apparent that the catalysts of this invention are effective in speeding up the condensation of phenols with carbonyl compounds containing oxygen in the carbonyl group and being otherwise composed of carbon and hydrogen atoms, i. e., aldehydes and ketones (but not carboxylic acids, which may also be called carbonyl compounds), although they are preferably used in the condensation of phenols with ketones to form bis-phenols.

Numerous modifications and variations in the invention as disclosed will be apparent to those skilled in the art and are within the spirit and scope of the appended claims.

I claim:

1. In a process wherein a phenol is condensed with a ketone in an acidic medium, the step which comprises carrying out the reaction in the presence of a mercapto-substituted aliphatic carboxylic acid.

2. In a process for the preparation of a bis-phenol by the acid condensation of reactants consisting of a phenol and a ketone, the step which comprises adding a mercapto-substituted aliphatic monocarboxylic acid to the reactants prior to the condensation.

3. In a process for the preparation of a bis-phenol by the acid condensation of a phenol with a ketone, the step which comprises carrying out the reaction in the presence of beta-mercapto propionic acid.

4. In a process for the preparation of a bis-phenol by the reaction of a phenol with a ketone in the presence of anhydrous hydrogen chloride as the condensing agent, the step which comprises carrying out the reaction in the presence of a mercapto-substituted aliphatic monocarboxylic acid containing from 2 to 5 carbon atoms.

5. In a process wherein acetone and phenol are reacted in the presence of an acid condensing agent to form 2,2-bis-(4-hydroxyphenyl) propane, the step which comprises carrying out the reaction in the presence of a mercapto-substituted aliphatic monocarboxylic acid containing 2 to 5 carbon atoms.

6. In a process wherein phenol and acetone are reacted in the presence of an acid condensing agent to form 2,2-bis-(4-hydroxyphenyl) propane, the step which comprises adding beta-mercapto propionic acid to the reactants prior to the reaction.

7. In a process wherein phenol and acetone are reacted in the presence of anhydrous hydrogen chloride to form 2,2-bis-(4-hydroxyphenyl) propane, the step which comprises carrying out the reaction in the presence of beta-mercapto propionic acid.

8. In a process wherein phenol and acetone are reacted in the presence of an acid condensing agent to form 2,2-bis-(4-hydroxyphenyl) propane, the step which comprises adding acetone di-(beta-carboxyethyl) mercaptol to the reactants prior to the reaction.

9. In a process wherein a phenol is condensed with a ketone in an acidic medium, the step which comprises carrying out the condensation in the presence of a catalyst selected from the class consisting of mercapto-substituted aliphatic carboxylic acids and the mercaptols and mercaptals of such mercapto-acids.

10. In a process wherein a phenol is condensed with a carbonyl compound containing oxygen in carbonyl linkage and being otherwise composed exclusively of carbon and hydrogen atoms, in an acidic medium, the step which comprises carrying out the condensation in the presence of a catalyst selected from the class consisting of mercapto-substituted aliphatic carboxylic acids and the mercaptols and mercaptals of such mercapto-acids.

JACOB EDEN JANSEN.

REFERENCES CITED

The following references are of record in the file of this patent:

UNITED STATES PATENTS

| Number | Name | Date |
|---|---|---|
| 2,359,249 | Perkins et al. | Sept. 26, 1944 |